(12) United States Patent
Fujiyoshi et al.

(10) Patent No.: US 10,843,576 B2
(45) Date of Patent: Nov. 24, 2020

(54) ELECTRIC VEHICLE

(71) Applicant: Toyota Jidosha Kabushiki Kaisha, Toyota (JP)

(72) Inventors: Tadashi Fujiyoshi, Susono (JP); Junichi Deguchi, Susono (JP); Hideki Kubonoya, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 65 days.

(21) Appl. No.: 16/216,026

(22) Filed: Dec. 11, 2018

(65) Prior Publication Data

US 2019/0193578 A1 Jun. 27, 2019

(30) Foreign Application Priority Data

Dec. 25, 2017 (JP) .................. 2017-248430

(51) Int. Cl.
*B60L 15/20* (2006.01)

(52) U.S. Cl.
CPC ....... *B60L 15/2036* (2013.01); *B60L 15/2009* (2013.01); *B60L 2220/42* (2013.01); *B60L 2220/46* (2013.01); *B60L 2240/12* (2013.01); *B60L 2260/26* (2013.01)

(58) Field of Classification Search
CPC ............. B60L 15/2036; B60L 15/2009; B60L 2240/12; B60L 2220/46; B60L 2260/26; B60L 2220/42; B60L 15/20; B60K 7/0007

USPC .......................................... 701/22
See application file for complete search history.

(56) References Cited

U.S. PATENT DOCUMENTS 5,549,172 A * 8/1996 Mutoh .................. B60L 15/20
180/65.1

FOREIGN PATENT DOCUMENTS

JP 3933125 B2 6/2007
JP 2013158088 A 8/2013

* cited by examiner

*Primary Examiner* — Brian P Sweeney
(74) *Attorney, Agent, or Firm* — Dinsmore & Shohl LLP

(57) ABSTRACT

An electric vehicle includes front-wheel electric motor and rear-wheel electric motor driving front and rear wheels, respectively; a control unit controlling driving of those electric motors. Further, one of the electric motors is a permanent-magnet motor and the other is a magnetless motor, a maximum output of the permanent-magnet motor is smaller than a maximum output of the magnetless motor, and the control unit includes: a first drive control unit configured to drive the permanent-magnet motor when vehicle speed is in a first vehicle-speed range; and a second drive control unit configured to drive only the magnetless motor when the vehicle speed is in a second vehicle speed range, vehicle speeds in the second vehicle speed range are greater than vehicle speeds in the first vehicle-speed range.

3 Claims, 7 Drawing Sheets

DURING REGENERATION

SMALL DECELERATION

LARGE DECELERATION

ELECTRIC VEHICLE

CROSS-REFERENCE TO RELATED APPLICATION(S)

The present application claims priority to and incorporates by reference the entire contents of Japanese Patent Application No. 2017-248430 filed in Japan on Dec. 25, 2017.

BACKGROUND

The present disclosure relates to an electric vehicle.

Japanese Patent No. 3933125 discloses an electric vehicle in which four wheels thereof are driven by an electric motor. This electric vehicle includes a permanent-magnet motor using a permanent magnet as a front-wheel electric motor for driving the front wheels, and a magnetless motor not using a permanent magnet as a rear-wheel electric motor for driving the rear wheels.

In the electric vehicle disclosed in Japanese Patent No. 3933125, since the permanent-magnet motor and the magnetless motor having different characteristics need to correspond to various traveling states, for example, from a state of low vehicle speed and high load to a state of high vehicle speed and low load, it may be difficult to improve power performance and reduce electric power consumption at the same time. Specifically, since a counter electromotive force is generated by the permanent magnet during the permanent-magnet motor rotates, the output is greatly decreased due to the counter electromotive force during high-speed rotation. For this reason, in the above-disclosed electric vehicle, a power loss is occurred due to the counter electromotive force generated in the permanent-magnet motor at a high vehicle speed.

SUMMARY

There is a need for providing an electric vehicle capable of improving the power performance of the vehicle and of reducing the electric power consumption.

An electric vehicle includes: a front-wheel electric-motor driving front wheels; a rear-wheel electric motor driving rear wheels; and a control unit controlling driving of the front-wheel electric motor and the rear-wheel electric motor. Further, one of the front-wheel electric motor and the rear-wheel electric motor is a permanent-magnet motor, which uses a permanent magnet, and another is a magnetless motor, which no permanent magnet is used, a maximum output of the permanent-magnet motor is smaller than a maximum output of the magnetless motor, and the control unit includes: a first drive control unit driving the permanent-magnet motor when a vehicle speed of the electric vehicle is in a first vehicle-speed range; and a second drive control unit driving only the magnetless motor when the vehicle speed is in a second vehicle speed range, where vehicle speeds in the second vehicle speed range are greater than vehicle speeds in the first vehicle-speed range.

DETAILED DESCRIPTION

Hereinafter, an electric vehicle according to an embodiment of the present disclosure is specifically described with reference to the accompanied drawings.

Figure 1:
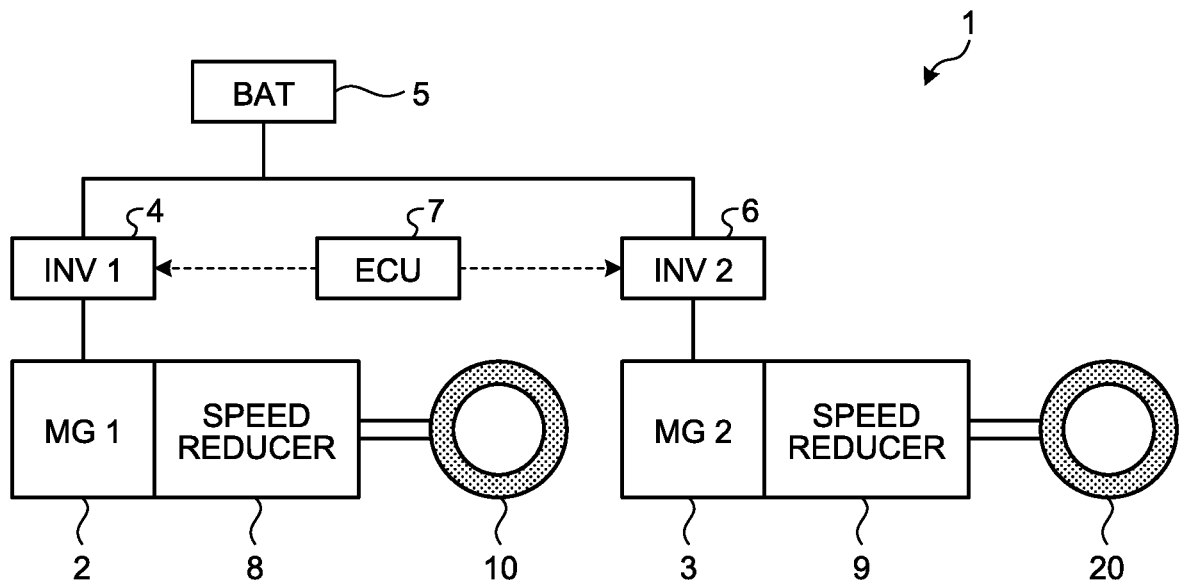
FIG. 1 is a diagram illustrating an example system configuration of an electric vehicle according to an embodiment.

FIG. 1 is a diagram schematically illustrating an example electric vehicle according to an embodiment. An electric vehicle 1 drives four wheels by an electric motor, and includes a first motor generator (MG 1) that is a front-wheel electric motor for driving front wheels 10, and a second motor generator (MG 2) that is a rear-wheel electric motor for driving rear wheels 20. The front-wheel electric motor is constituted by a permanent-magnet motor (hereinafter referred to as a "PM motor") 2 using a permanent magnet. The PM motor 2 can function as a motor and a generator. The rear-wheel electric motor is constituted by a switched reluctance motor (hereinafter referred to as an "SR motor") 3. The SR motor 3 can function as a motor and a generator. The PM motor 2 is electrically connected to a battery (BAT) 5 via a first inverter (INV 1) 4. The SR motor 3 is electrically connected to the battery 5 via a second inverter (INV 2) 6. The inverters A and 6 are controlled by an Electronic Control Unit (ECU) 7, and the motors 2 and 3 each can thereby function as a motor or a generator.

Figure 2:
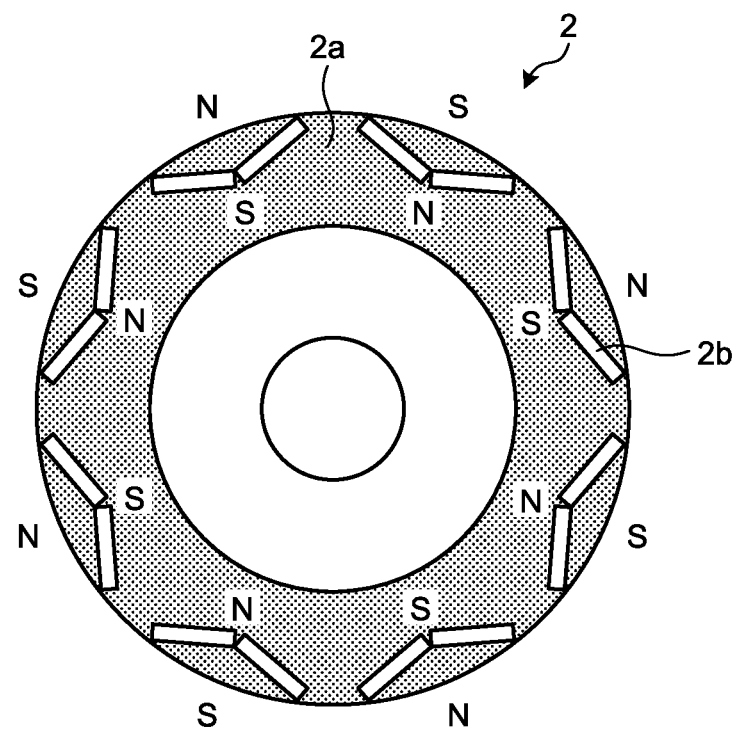
FIG. 2 is a diagram illustrating an example permanent-magnet motor.

As illustrated in FIG. 2, the PM motor 2 has a structure in which permanent magnets 2b are embedded in a rotor 2a. In the PM motor 2, a counter electromotive force is generated by the permanent magnets 2b as long as the rotor 2a rotates even when no current flows in the coil, and a negative torque is generated accordingly. As the number of permanent magnets 2b is increased in the PM motor 2, the low speed torque and efficiency are improved, but the output decreases at high-speed rotation.

Figure 3:
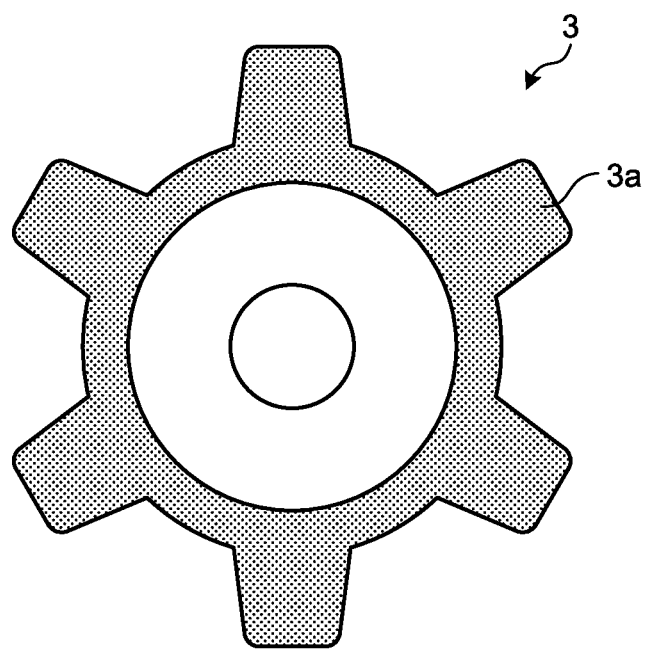
FIG. 3 is a diagram illustrating an example switched reluctance motor.

As illustrated in FIG. 3, the SR motor 3 includes a rotor 3a having a salient pole structure and a stator (not illustrated) having a salient pole structure. In the SR motor 3, a force attracting the salient poles of the rotor 3a is generated when a current flows in the coil, and no negative torque is generated although the rotor 3a rotates while no current flows in the coil. The output of the SR motor 3 at high-speed rotation is maintained up to a higher rotational speed than that of the PM motor 2 and other magnetless motors (e.g., an induction machine and a synchronous motor). On the other hand, in order to improve low speed torque of the SR motor 3, the thickness of the lamination thickness is more likely to increase than that of the PM motor 2. The electric vehicle 1 including both the PM motor 2 and the SR motor 3 having different characteristics from each other is designed so as to improve the low speed torque and efficiency using the PM motor 2 and to ensure an output at high-speed rotation using the SR motor 3.

Figure 4:
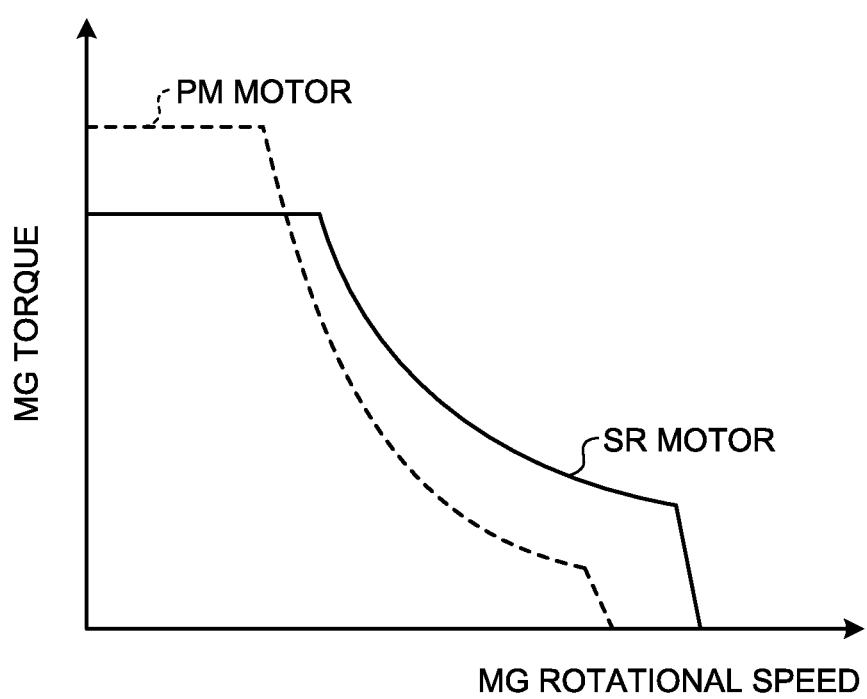
FIG. 4 is a graph illustrating a comparison in characteristics between the permanent-magnet motor and the switched reluctance motor.

As illustrated in FIG. 4, when characteristics are compared between the PM motor 2 and the SR motor 3, the SR motor 3 can output more torque on the higher rotational speed side than the PM motor 2. The torque of the PM motor 2 at a lower rotational speed is greater than the torque of the SR motor 3. On the other hand, the torque of the SR motor 3 at a higher rotational speed is greater than the torque of the PM motor 2. In the example of FIG. 4, the maximum output and the body sizes of the PM motor 2 and those of the SR motor 3 are set to be the same. In FIG. 4, the MG rotational speed refers to the rotational speed of each motor, and the MG torque refers to the torque of each motor. The MG rotational speed is proportional to the vehicle speed of the electric vehicle 1.

In the electric vehicle 1, the maximum output of the PM motor 2 is reduced. Here, with reference to FIGS. 5 and 6, cases are described where the PM motor 2 has high output and where the PM motor 2 has low output.

Figure 5:
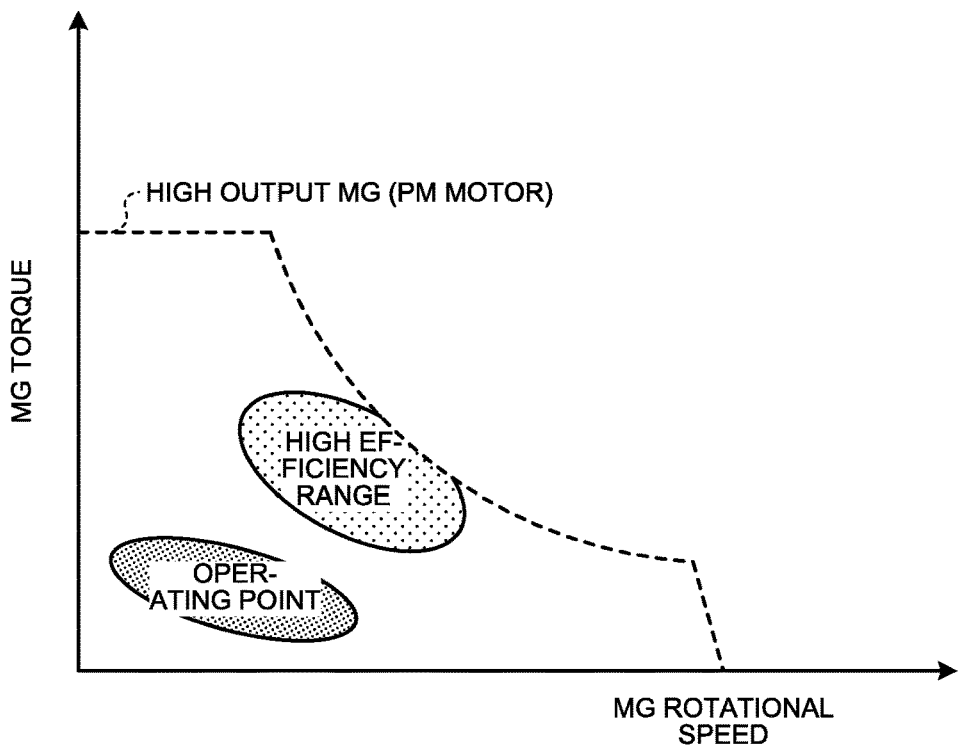
FIG. 5 is a graph illustrating a case where the permanent-magnet motor outputs a high power.

As illustrated in FIG. 5, when the PM motor 2 is a high output MG, the efficient operating range (high efficiency range) is an operating range at a middle vehicle speed and at medium load. However, when the electric vehicle 1 travels in streets or the like, the operating point of the PM motor 2 is in an operating range at a low vehicle speed and at low load. That is, the load (the torque to be used) is small relative to the maximum output of the PM motor 2 during normal traveling such as traveling in streets or steady traveling (low load traveling). In the electric vehicle 1, the normal driving mode is frequently selected as a driving mode. In other words, it frequently occurs that the load is small relative to the maximum output of the PM motor 2. Thus, in the case of the high output MG, the operating point during the traveling in streets is separated from the high efficiency range, so that the efficiency decreases. In response, by reducing the output characteristic of the PM motor 2 (lowering the output of the PM motor 2) as illustrated in FIG. 6, the operating point of the PM motor 2 can be overlapped with the high efficiency range.

Figure 6:
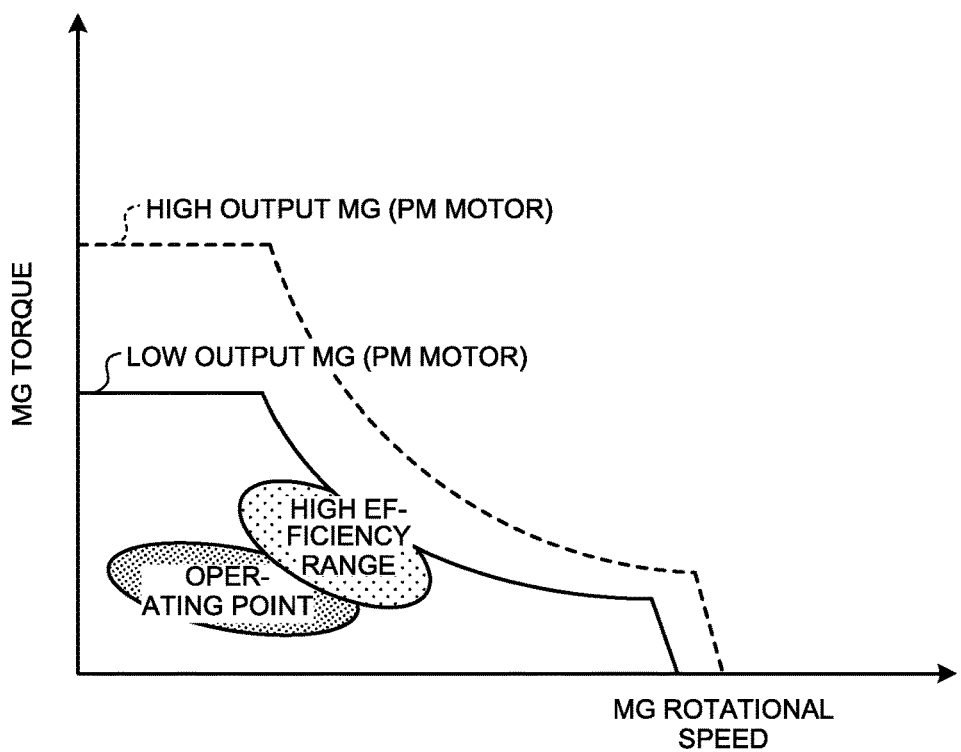
FIG. 6 is a graph illustrating a case where the permanent-magnet outputs a low power.

As illustrated in FIG. 6, when the PM motor 2 is a low output MG, the high efficiency range is observed on a lower vehicle speed side and on a lower load side when compared with the high output MG, so that the operating point during the traveling in streets is overlapped with the high efficiency range. Thus, in the case of the low output MG, it is possible to drive the PM motor 2 in the efficient operating range during the traveling in streets. Furthermore, since the efficiency of the PM motor 2 is greater than that of the SR motor 3, the electric vehicle 1 travels with the PM motor 2 during normal traveling.

Referring back to FIG. 1, in the electric vehicle 1, a front transaxle, which transmits the power (MG 1 torque) output from the PM motor 2 which is the low output MG to the front wheels 10, and a rear transaxle, which transmits the power (MG 2 torque) output from the SR motor 3 to the rear wheels 20, are independently provided. The PM motor 2 is connected to the front wheels 10 via a speed reducer 8 and a differential device (not illustrated) so as to transmit the power. The SB motor 3 is connected to the rear wheels 20 via a speed reducer 9 and a differential device (not illustrated) so as to transmit the power. In this manner, the MG 1 torque is transmitted only to the front wheels 10, and the MG 2 torque is transmitted only to the rear wheels 20. In the electric vehicle 1, the maximum output of the PM motor 2 is smaller than the maximum output of the SR motor 3.

Figure 7:
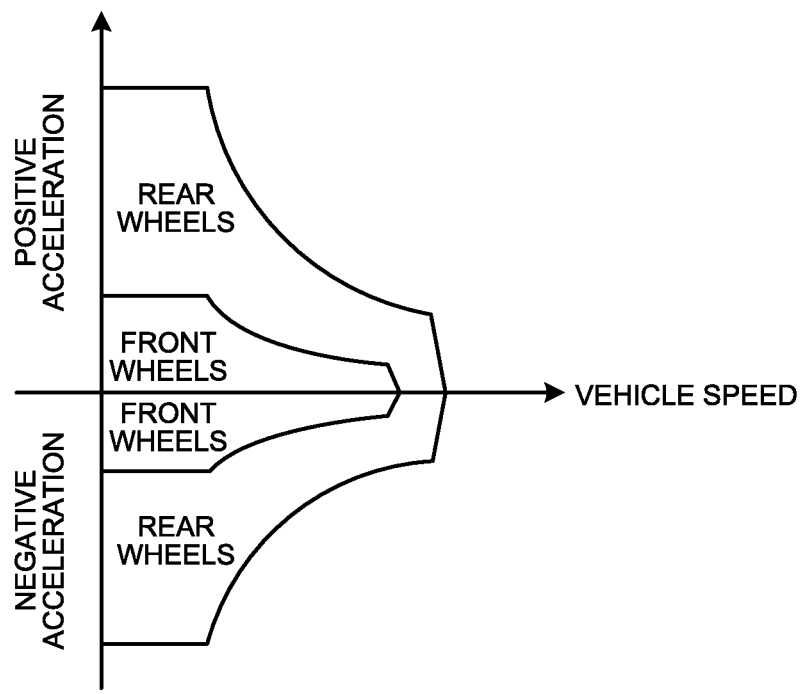
FIG. 7 is a diagram illustrating characteristics of a front-wheel electric motor and a rear-wheel electric motor.

FIG. 7 is a diagram illustrating the behaviors of the front-wheel electric motor and the rear-wheel electric motor. In FIG. 7, the front wheels correspond to the PM motor 2 and the rear wheels correspond to the SR motor 3. The driving of the motor 2 or 3 is selected based on the required driving force which is determined by the pedaling amount of the accelerator pedal (accelerator opening) and the vehicle speed. The traveling mode thereof is selected by the electronic-control unit 7.

Figure 8:
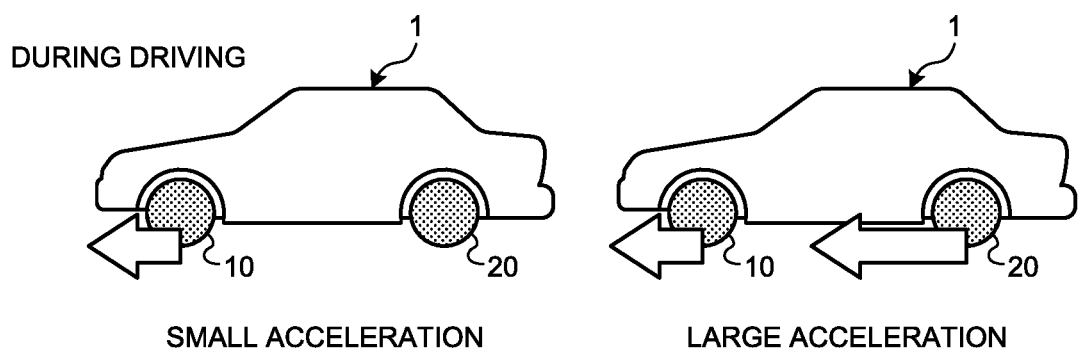
FIG. 8 is a diagram illustrating a vehicle state upon driving.

As illustrated in FIG. 7, the torque that the PM motor 2 for the front wheels can output is smaller and the rotational speed at which the torque can be output is lower than the SR motor 3 for the rear wheels. For example, when the required driving force is smaller than the torque of the PM motor 2 (when the required acceleration is small), only the PM motor 2 is driven (see FIGS. 7 and 8). On the other hand, when the required driving force is greater than the torque of the PM motor 2 (when the required acceleration is large), the SR motor 3 is driven in addition to the PM motor 2 to add the driving torque of the SR motor 3 to the driving torque of the PM motor 2 (see FIGS. 7 and 8). That is, the insufficient driving torque of the PM motor 2 is compensated by the driving torque of the SR motor 3. In the drive control of the motors 2 and 3, the PM motor 2 having relatively high efficiency is preferentially driven, and the SR motor 3 is driven when the torque that the PM motor 2 can output does not reach the required driving force. This is not limited to forward traveling (driving) in which the acceleration is positive, and is also applied to braking (deceleration) in which the acceleration is negative. The negative acceleration is referred to as as deceleration.

Figure 9:
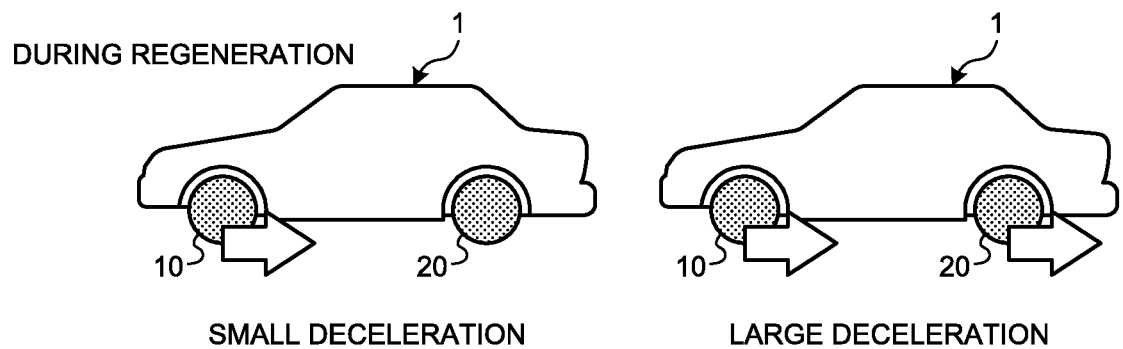
FIG. 9 is a diagram illustrating a vehicle state upon regeneration.

At the time of deceleration, by regeneratively controlling the motors 2 and 3, the motors 2 and 3 function as generators, and regenerate energy. At that time, braking torque (regenerative torque) is generated from the motors 2 and 3. Specifically, when the required braking force is smaller than the torque of the PM motor 2 (when the required deceleration is small), only the PM motor 2 is regeneratively controlled to generate the braking torque (see FIGS. 7 and 9). On the other hand, when the required braking force is greater than the torque of the PM motor 2 (when the required deceleration is large), the SR motor 3 is regeneratively controlled in addition to the PM motor 2 to add the braking torque of the SR motor 3 to the braking torque of the PM motor 2 (see FIGS. 7 and 9). When the required braking force is greater than the sum of the torque of the PM motor 2 and the torque of the SR motor 3, a braking torque is generated by a friction brake provided to each wheel. In this manner, in the regenerative control of the motors 2 and 3, energy regeneration is performed preferentially by the PM motor 2 having relatively high efficiency, and the SR motor 3 is regeneratively controlled when the torque that the PM motor 2 can output does not reach the required braking force. The required braking force is determined based on the pedaling amount of the brake pedal or the like.

The electronic control unit 7 can also perform drive control based on the vehicle speed when a traveling mode is selected. Specifically, the electronic control unit 7 includes a first drive control unit that performs control to drive the PM motor 2 at a low vehicle speed, and a second drive control unit that performs control to drive only the SR motor 3 at a high vehicle speed. The first drive control unit (the electronic control unit 7) can drive the SR motor 3 in addition to the PM motor 2, and performs, in this case, the output control so that the output of the PM motor 2 is greater than the output of the SR motor 3. Note that, the vehicle speed information detected by a vehicle speed sensor mounted on the electric vehicle 1 is input to the electronic control unit 7.

As described above, in the electric vehicle 1 according to an embodiment, it is possible to reduce the electric power consumption (improve the electricity efficiently) during the normal driving while improving the power characteristic by increasing the overall output of the front-wheel electric motor and the rear-wheel electric motor. It is possible to secure output at a high vehicle speed by the SR motor 3 which is the rear-wheel electric motor while the low speed torque and efficiency are secured by the PM motor 2 which is the front-wheel electric motor. In addition, since the electric vehicle 1 travels at a high speed only with the SR motor 3, it is possible to suppress the occurrence of the loss due to a counter electromotive force at a high vehicle speed. Furthermore, by using the SR motor 3 as the motor having higher output, no counter electromotive force is generated when the SR motor 3 rotates in a no-load state, and no drag loss is generated.

At the time of deceleration, since traction is applied to the front wheels 10, and the regenerative load of the motor is easily increased, it is possible to absorb more regenerative electric power by providing the PM motor 2 with high efficiency on the front wheels 10. When the regenerative load exceeding the maximum torque of the PM motor 2 is applied, energy is regenerated by utilizing the rear wheels 20. In addition, at the time of strong acceleration start, since traction is applied to the rear wheels 20, it is possible to gain the traction of the wheels at the time of strong acceleration start by providing the SR motor 3 with large output on the rear wheels 20.

Furthermore, since no engine is mounted in the electric vehicle 1, it is possible to secure the installation space for the battery 5 as compared with a vehicle equipped with an engine. Thus, it is possible to mount more batteries 5 in the electric vehicle 1, and to mount a motor with higher output.

It should be noted that the present disclosure is not limited to the above-described embodiment, and can be appropriately modified within a scope of the present disclosure. For example, since the permanent-magnet motor is only required to be a motor using a permanent magnet, the permanent-magnet motor is not limited to an embedded type (i.e., Interior Permanent Magnet (IPM)), and a structure in which a permanent magnet is provided on the rotor surface (i.e., Surface Permanent Magnet (SPM)) may be used. The magnetless motor is not limited to the SR motor 3, and an induction machine or a synchronous motor may be used.

In addition, in the electric vehicle 1, the output of one motor for the front and rear wheels is kept small, and a permanent-magnet motor is used as the small output motor. Then, the maximum output of the permanent-magnet motor is to be smaller than the maximum output of the magnetless motor. In other words, when the output of the motor for the rear wheels is to be small, it is possible to use the magnetless motor as the front-wheel electric motor and to use the permanent-magnet motor as the rear-wheel electric motor. In short, in the electric vehicle 1, either the front wheels or the rear wheels may be driven by the permanent-magnet motor and the other may be driven by the magnetless motor (an induction machine, a synchronous motor, a switched reluctance motor or the like).

Figure 10:
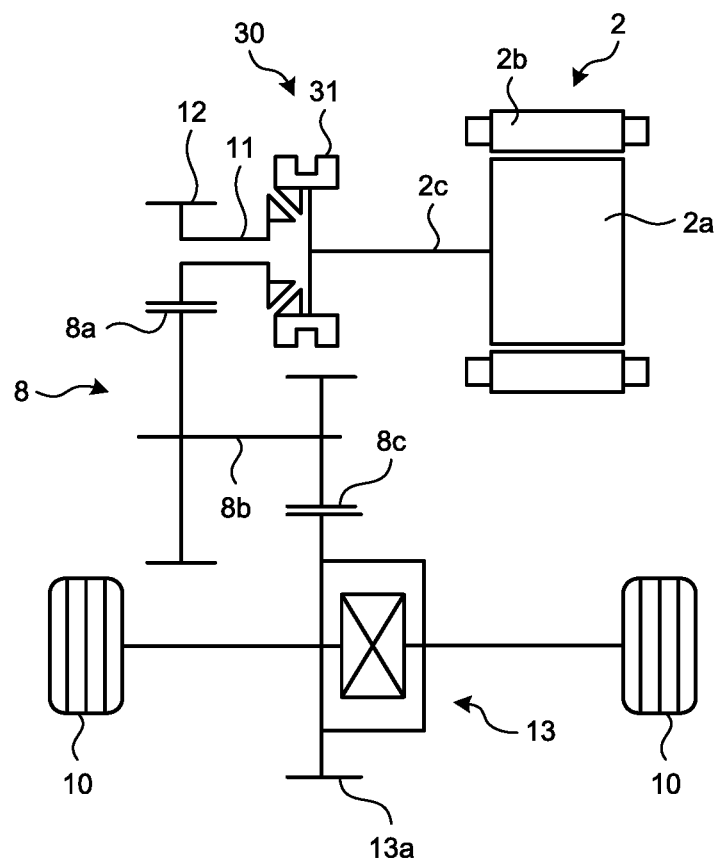
FIG. 10 is a skeleton diagram schematically illustrating a case where a separation mechanism is a dog clutch.

Next, a modified example of the electric vehicle 1 is described with reference to FIGS. 10 and 11. In this modified example, a motor separation mechanism is provided between the PM motor 2 and the front wheels 10. The motor separation mechanism is an engagement device capable of selectively blocking a power transmission path from the PM motor 2 to the front wheel 10, such as a dog clutch or a friction clutch. FIG. 10 exemplifies a case where a dog clutch is used the motor separation mechanism, and FIG. 11 exemplifies a case where a friction clutch is used as the motor separation mechanism.

As illustrated in FIG. 10, in the front transaxle, a dog clutch 30 is provided as the motor separation mechanism between the PM motor 2 and the front wheels 10. The dog clutch 30 is switched between a meshing state (engaging state) and a non-meshing state (opening state) by a sleeve 31 that moves in the axial direction. The operation of the sleeve 31 is controlled by the electronic control unit 7. That is, the electronic control unit 7 performs control to switch the dog clutch 30 between the engaging state and the opening state. In the example of FIG. 10, a rotor shaft 2c of the PM motor 2 is connected to the front wheels 10 via the dog clutch 30, an input shaft 11, a drive gear 12, the speed reducer 8 on the front side, and a differential device 13 on the front side. The rotor shaft 2c rotates integrally with the rotor 2a and rotates integrally with the input elements of the dog clutch 30. The output elements of the dog clutch 30 rotate integrally with the input shaft 11 and the drive gear 12. The drive gear 12 meshes with a counter driven gear 8a of the speed reducer 8. The counter driven gear 8a rotates integrally with a counter shaft 8b and a counter drive gear 8c. The counter drive gear 8c meshes with a differential ring gear 13a of the differential device 13.

Figure 11:
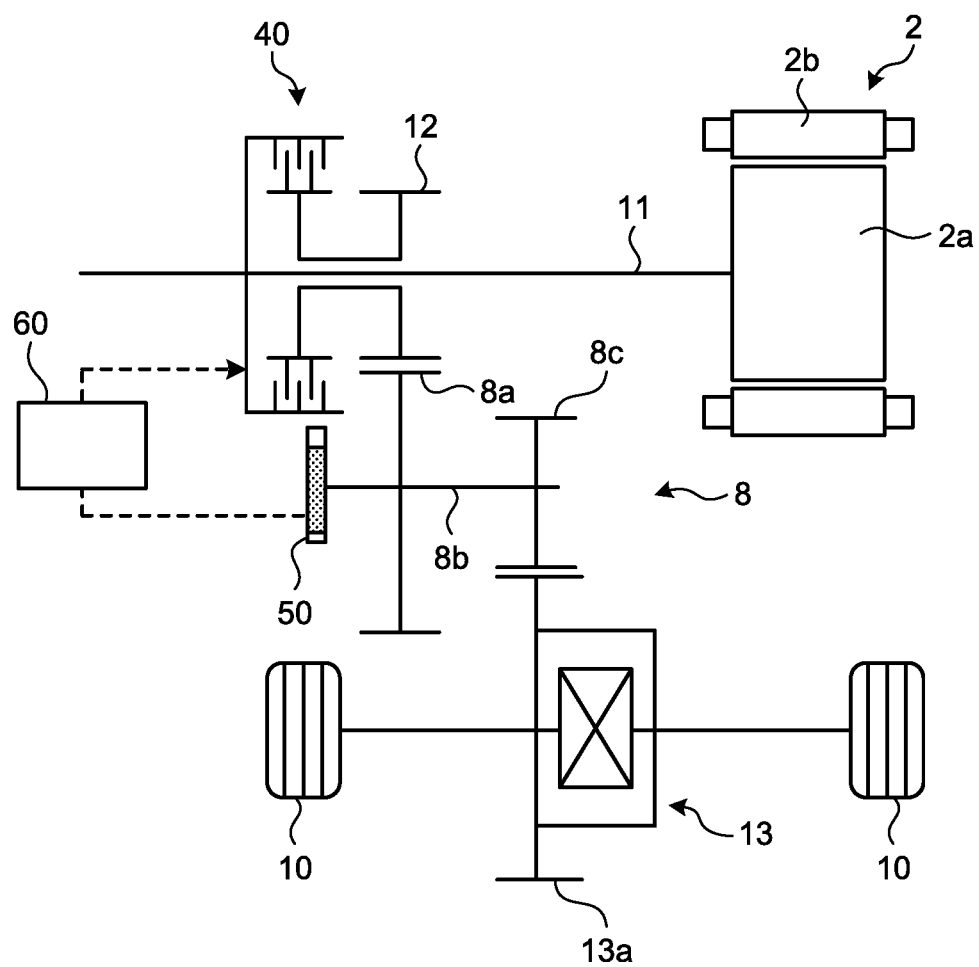
FIG. 11 is a skeleton diagram schematically illustrating a case where the separation mechanism is a friction clutch.

In the example of FIG. 11, a friction clutch 40 is used as the motor separation mechanism. The friction clutch 40 is a multiple disc clutch including a hydraulic pressure actuator. As illustrated in FIG. 11, a hydraulic pressure 1 control circuit 60 using a mechanical oil pump 50 as a hydraulic pressure supply source is provided, and hydraulic pressure is supplied from the hydraulic pressure control circuit 60 to the friction clutch 40. The friction clutch 40 includes an input element (friction engagement element) that rotates integrally with the input shaft 11, and an output element (friction engagement element) that rotates integrally with the drive gear 12. The friction clutch 40 is switched between the engaging state and the opening state based on the hydraulic pressure supplied from the hydraulic pressure control circuit 60 to the hydraulic chamber. The rotor 2a is coupled so as to rotate integrally with the input shaft 11. Note that, the mechanical oil pump 50 is not limited to being driven by the counter shaft 8b, and may be driven by any of the rotating shafts of the electric vehicle 1.

According to the modified example in which the motor separation mechanism is provided, it is possible to separate the PM motor 2 from the front wheels 10 during high-speed traveling. Thus, since it is possible to suppress the occurrence of the counter electromotive force in the PM motor 2 while the electric vehicle 1 travels at a high speed, the power performance and the electric power consumption can be reduced. That is, by driving the rear wheels 20 with the SR motor 3 while the PM motor 2 is being separated from the front wheels 10, it is possible for the electric vehicle 1 to travel at a high speed and to improve the maximum speed of the electric vehicle 1. Furthermore, since the counter electromotive force to be generated at high-speed rotation increases as the magnet amount increases, the PM motor 2 has the characteristic that sufficient output cannot be obtained at a high vehicle speed and that the heat generation amount becomes large. Thus, by separating the PM motor 2 from the front wheels 10 by the motor separation mechanism, it is possible to suppress rising of the temperature inside the front transaxle (the temperature of the oil for cooling the PM motor 2).

Figure 12:
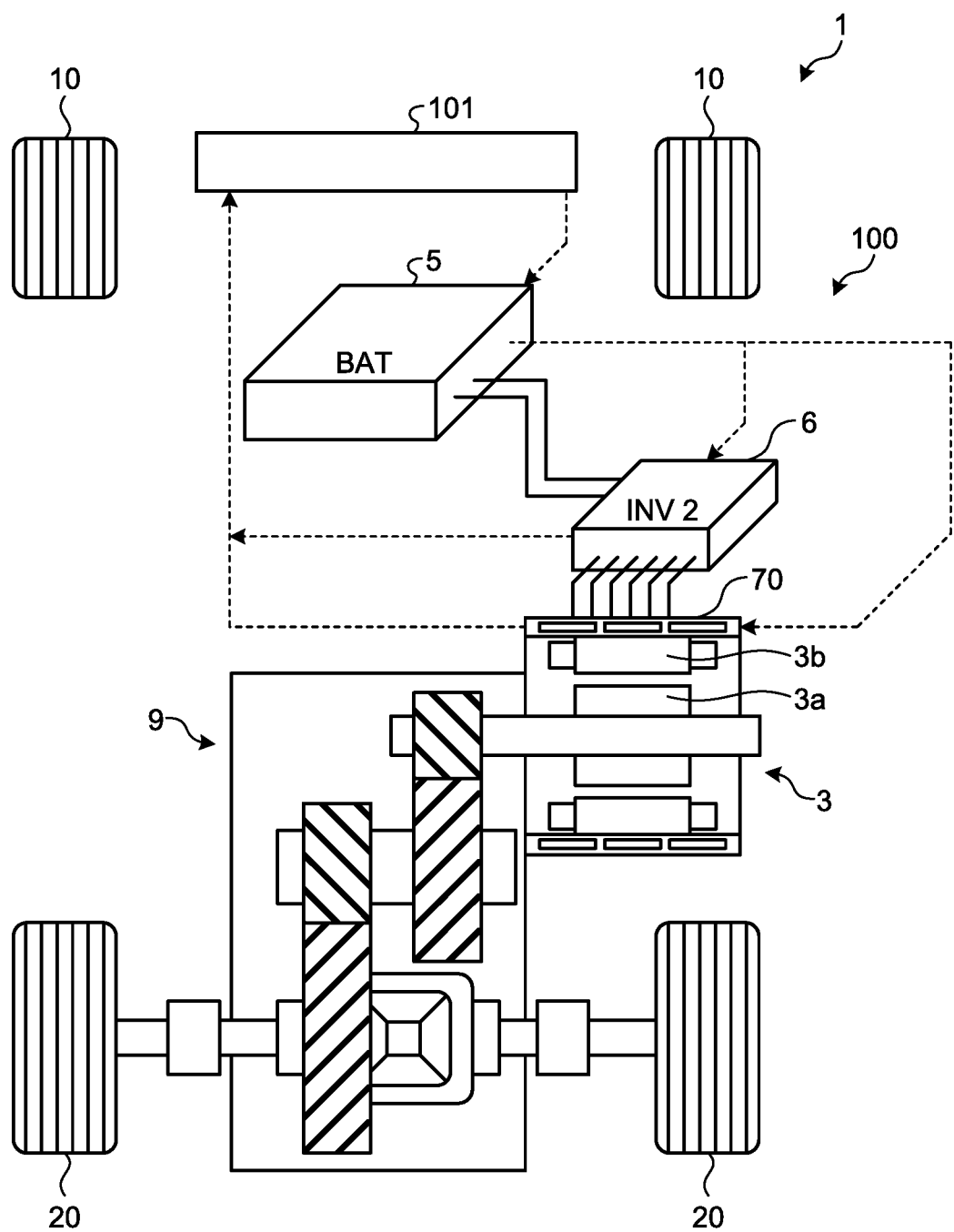
FIG. 12 is a schematic diagram illustrating a cooling device for water-cooling the switched reluctance motor.

As another modified example, the SR motor 3 may be cooled by a water-cooling-type cooling device 100 as illustrated in FIG. 12. Since the rotor 3a of the SR motor 3 does not include a permanent magnet or a squirrel-cage, it is not necessary to cool the rotor 3a. Thus, in the rear transaxle, a stator 3b of the SR motor 3 is press-fitted and fixed to a casing 70, and the stator 3b is cooled by the water-cooling-type cooling device 100.

First, the casing 70 accommodates the SR motor 3. By press-fitting and engaging the stator 3b with the casing 70, the fixing structure in which the outer peripheral portion of the stator 3b is tightly fixed to the inner wall of the casing 70 is obtained. This increases the rigidity of the stator 3b, and it is possible to reduce the noise generated during the SR motor 3 rotates. When the torque is generated, the SR motor 3 generates vibrations due to the force attracting the salient poles of the rotor 3a, the stator 3b is deformed by this attractive force, and the noise easily occurs.

The casing 70 is provided with a flow path through which coolant for cooling the stator 3b flows. The flow path in the casing 70 is connected to an inverter cooling circuit. For this reason, the outer peripheral portion of the stator 3b is in close contact with the casing 70, and the cooling effect is improved when the coolant for cooling the SR motor 3 flows through the outer periphery of the stator 3b. In particular, the coolant for cooling the SR motor 3 is cooling water circulating in the inverter cooling circuit, and is cooling water for cooling the battery 5 and the second inverter 6. As illustrated in FIG. 12, the inverter cooling circuit includes a radiator 101 for air cooling the cooling water and a water pump (not illustrated) for circulating the cooling water.

According to the modified example using the water-cooling-type cooling device 100, it is possible to eliminate an oil cooler for cooling motor cooling oil and to simplify (downsize or eliminate) an oil pump while suppressing the vibrations and noise which are the problems of the SR motor 3. Furthermore, the SR motor 3 does not need to cool the rotor 3a, and is capable of using the water-cooling-type cooling device 100.

According to an embodiment, it is possible to drive the motor within an efficient operating range for the permanent-magnet motor at a low vehicle speed, and to reduce the electric power consumption.

According to an embodiment, by separating the permanent-magnet motor from the front wheels by the motor separation mechanism, it is possible to suppress the occurrence of the counter electromotive force in the permanent-magnet motor during the front wheels rotate. This reduces the electric power consumption.

According to an embodiment, it is possible to change the cooling system of the switched reluctance motor from an oil-cooling type to a water-cooling type, and to eliminate the components used in the oil-cooling type. In addition, by tightly fixing the stator to the casing, the rigidity of the stator is increased, and the cooling performance of the stator by the coolant is improved.

In the present disclosure, since the maximum output of a permanent-magnet motor is smaller than the maximum output of a magnetless motor, the high efficiency range of the permanent-magnet motor is in a range at a lower rotational speed and at lower load. Thus, by driving the permanent-magnet motor at a low vehicle speed, the electric power consumption is reduced. In addition, by driving only the magnetless motor at a high vehicle speed, the loss due to the counter electromotive force can be suppressed, and the power performance is improved.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric vehicle comprising:
   a front-wheel electric motor configured to drive front wheels;
   a rear-wheel electric motor configured to drive rear wheels; and
   a control unit configured to control driving of the front-wheel electric motor and the rear-wheel electric motor, wherein
   one of the front-wheel electric motor and the rear-wheel electric motor is a permanent-magnet motor, which uses a permanent magnet, and another is a magnetless motor, which no permanent magnet is used,
   a maximum output of the permanent-magnet motor is smaller than a maximum output of the magnetless motor,
   the control unit includes:
     a first drive control unit configured to drive the permanent-magnet motor when a vehicle speed of the electric vehicle is in a first vehicle-speed range; and
     a second drive control unit configured to drive only the magnetless motor when the vehicle speed is in a second vehicle speed range, where vehicle speeds in the second vehicle speed range are greater than vehicle speeds in the first vehicle-speed range,
   the front-wheel electric motor is the permanent-magnet motor,
   the rear-wheel electric motor is the magnetless motor, and
   a motor separation mechanism is provided between the front wheels and the permanent-magnet motor, the motor separation mechanism is an engagement device that selectively blocks a power transmission path between the front wheels and the permanent-magnet motor.

2. The electric vehicle according to claim 1, wherein the first drive control unit causes output of the permanent-magnet motor to be larger than output of the magnetless motor when the vehicle speed is in the first vehicle-speed range.

3. The electric vehicle according to claim 1, wherein
   the magnetless motor is a switched reluctance motor including a stator and a rotor each having a salient pole structure,
   the stator is tightly fixed to a casing accommodating the switched reluctance motor,
   the casing includes a flow path through which coolant for cooling the stator flows, and
   the flow path constitutes an inverter cooling circuit in which cooling water circulates for cooling an inverter electrically connected to the switched reluctance motor.

* * * * *

UNITED STATES PATENT AND TRADEMARK OFFICE
CERTIFICATE OF CORRECTION

PATENT NO. : 10,843,576 B2
APPLICATION NO. : 16/216026
DATED : November 24, 2020
INVENTOR(S) : Tadashi Fujiyoshi, Junichi Deguchi and Hideki Kubonoya It is certified that error appears in the above-identified patent and that said Letters Patent is hereby corrected as shown below:

On the Title Page

Item (71), applicant, city, delete "Toyota" and insert --Toyota-shi Aichi-ken--, therefor.

Item (72), inventor 1, city, delete "Susono" and insert --Susono-shi Shizuoka-ken--, therefor.

Item (72), inventor 2, city, delete "Susono" and insert --Susono-shi Shizuoka-ken--, therefor.

Item (72), inventor 3, city, delete "Toyota" and insert --Toyota-shi Aichi-ken--, therefor.

Item (73), assignee, city, delete "Toyota" and insert --Toyota-shi Aichi-ken--, therefor.

In the Specification

In Column 1, Line(s) 43, delete "electric-motor" and insert --electric motor--, therefor.

In Column 2, Line(s) 45, after "inverters", delete "A" and insert --4--, therefor.

In Column 3, Line(s) 65, before "motor 3", delete "SB" and insert --SR--, therefor.

In Column 4, Line(s) 12 & 13, delete "electronic-control" and insert --electronic control--, therefor.

In Column 6, Line(s) 35, after "pressure", delete "1".

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*